United States Patent [19]
Kolagotla et al.

[11] Patent Number: 6,049,858
[45] Date of Patent: Apr. 11, 2000

[54] MODULO ADDRESS GENERATOR WITH PRECOMPUTED COMPARISON AND CORRECTION TERMS

[75] Inventors: Ravi Kumar Kolagotla, Breinigsville; Mohit Kishore Prasad, Bethlehem, both of Pa.

[73] Assignee: Lucent Technologies Inc., Murray Hill, N.J.

[21] Appl. No.: 08/918,987

[22] Filed: Aug. 27, 1997

[51] Int. Cl.[7] ........................... G06F 12/06
[52] U.S. Cl. .................. 711/217; 711/218; 711/219; 711/220
[58] Field of Search .................. 711/217, 218, 711/219, 220

[56] References Cited

U.S. PATENT DOCUMENTS

| | | | |
|---|---|---|---|
| 4,202,035 | 5/1980 | Lane | 364/200 |
| 4,704,680 | 11/1987 | Saxe | 364/200 |
| 4,800,524 | 1/1989 | Roesgen | 364/900 |
| 4,809,156 | 2/1989 | Taber | 364/200 |
| 4,833,602 | 5/1989 | Levy et al. | 364/900 |
| 4,908,748 | 3/1990 | Pathak et al. | 364/200 |
| 4,935,867 | 6/1990 | Wang et al. | 364/200 |
| 5,276,827 | 1/1994 | Delaruelle et al. | 711/217 |
| 5,381,360 | 1/1995 | Shridhar et al. | 364/746 |
| 5,440,705 | 8/1995 | Wang et al. | 395/421.1 |
| 5,507,027 | 4/1996 | Kawamoto | 395/375 |
| 5,511,017 | 4/1996 | Cohen et al. | 364/746 |
| 5,623,621 | 4/1997 | Garde | 395/421.1 |
| 5,649,146 | 7/1997 | Riou | 711/217 |
| 5,659,698 | 8/1997 | Weng et al. | 711/211 |
| 5,659,700 | 8/1997 | Chen et al. | 711/217 |

*Primary Examiner*—Hiep T Nguyen
*Attorney, Agent, or Firm*—David L. Smith

[57] ABSTRACT

In accordance with the present invention, an address arithmetic unit provides a modulo addressing technique for addressing memory locations in a circular buffer. The address arithmetic unit includes a sign detector adapted to determine whether a sum of an address pointer and a precomputed comparison term is of a first state or a second state. A first adder adds an address pointer and a precomputed correction term to generate a first potential next address pointer. A second adder, operating in parallel with the first adder, adds the address pointer and a displacement to generate a second potential next address pointer. A selector adapted to select the first potential next address pointer as an output when the sign detector output and a sign bit of the displacement are different, and to select the second potential next address pointer as an output when the sign detector output and a sign bit of the displacement are the same.

7 Claims, 2 Drawing Sheets

6,049,858

MODULO ADDRESS GENERATOR WITH PRECOMPUTED COMPARISON AND CORRECTION TERMS

TECHNICAL FIELD

This application relates generally to modulo address generation for microprocessors and digital signal processors, and in particular to specialized circuitry and method for generating a true modulo address.

BACKGROUND OF THE INVENTION

Many applications performed on microprocessors or digital signal processors require the generation of addresses to fetch data from memory. One such application requires the appearance of a circular buffer such that data stored in a contiguous, finite portion of a memory array appears to be endless. The addressing technique used for circular buffers, known as modulo addressing, provides that an address stored in an address pointer will be incremented or decremented by a predetermined displacement for each memory access until a beginning or ending address boundary is reached or exceeded. When a beginning or ending address boundary is reached or exceeded, the address pointer for the next memory access will "wrap around" to the other end of the address range of the finite array.

Software addressing techniques have typically been used to generate modulo addresses in microprocessors. While only a few instruction cycles are required for each modulo address generating operation, in applications requiring intensive modulo address generation, as are often incurred in digital signal processing, a detrimental impact on processor performance occurs. Implementation of modulo addressing in hardware can obviate the detrimental impact on processor performance.

Modulo addressing is achieved in an address arithmetic unit by associating with a memory pointer a first register which stores either a beginning address or an ending address, and a second register which stores either the other of the ending or beginning address, or the length of the circular buffer being defined. As an example of modulo addressing, the first register may be set with a beginning address and the second register may be set with an ending address to define the address range of the finite array that comprises the circular buffer.

Known modulo addressing techniques are described in U.S. Pat. Nos. 5,623,621, 4,908,748, and 4,800,524. One shortcoming of existing modulo addressing techniques is that they are either complex and slow or are not true modulo addressing techniques. Present modulo addressing techniques either restrict the increment or decrement displacement value to be one or restrict the size of the number of locations of the circular buffer relative to the displacement value such that the number of locations of the circular buffer is an integral multiple of the displacement value. This limitation is to assure that when memory locations in the circular buffer are addressed, and the address pointer is post incremented or post decremented in preparation for accessing a subsequent address in the circular buffer, the beginning address or ending address will not be bypassed or skipped-over. Restricting the increment or decrement displacement value to be one, assures that eventually the address pointer will take on the beginning address or the ending address generated as a result of the post increment or post decrement operation, and that a comparison to the address stored in the beginning address register or ending address register will result in a match that will cause the address generator to "wrap around" to the other end of the array.

What is needed is a true modulo addressing technique that accommodates any displacement value, buffer size and location while using simple hardware that does not limit the speed of operation of a digital signal processor employing the technique.

SUMMARY OF THE INVENTION

In accordance with the present invention, an address arithmetic unit provides a modulo addressing technique for addressing memory locations in a circular buffer. The address arithmetic unit includes a sign detector adapted to determine whether a sum of an address pointer and a precomputed comparison term is of a first state or a second state. A first adder adds an address pointer and a precomputed correction term to generate a first potential next address pointer. A second adder, operating in parallel with the first adder, adds the address pointer and a displacement to generate a second potential next address pointer. A selector adapted to select the first potential next address pointer as an output when the sign detector output and a sign bit of the displacement are different, and to select the second potential next address pointer as an output when the sign detector output and a sign bit of the displacement are the same.

DETAILED DESCRIPTION

Figure 1:
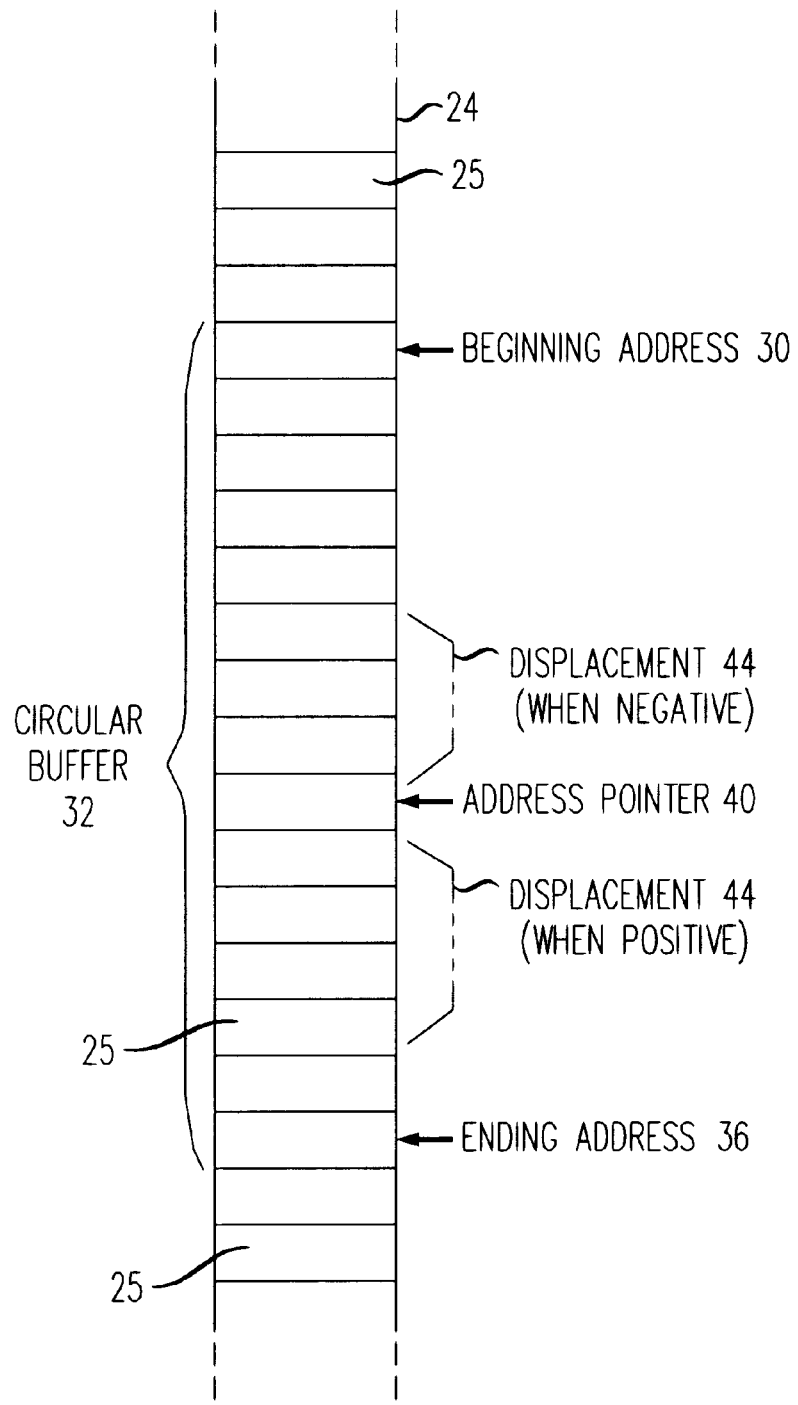
FIG. 1 is a portion of a memory array, including a circular buffer defined by a beginning address and an ending address, an address pointer, and a displacement having either a positive or negative displacement.

The address management system of the present invention may be used to generate modulo addresses, such as in a microprocessor, microcontroller, or digital signal processor. FIG. 1 illustrates a portion of a memory array 24 having individually addressable memory locations or registers 25 in an integrated circuit 26. Also shown are beginning address 30 which defines the address of the initial memory location in memory array 24 where circular buffer 32 begins and an ending address 36 which defines the address of the last memory location in memory array 24 where circular buffer 32 ends. The beginning address 30 and ending address 36 thus define the address boundaries of circular buffer 32. Address pointer 40 retains the address of the memory location or register of circular buffer 32 that will be accessed next. Displacement 44 can be either positive, typically but not limited to indicating an increment, or negative, typically but not limited to indicating a decrement. The displacement is used to step through addresses of circular buffer 32 in a selective manner that is user defined. Typically the displacement is a fixed value, but the invention is not limited thereto.

Given a displacement 44, that is either an increment or decrement, circular buffer 32 is addressed typically starting at beginning address 30 for increments, and typically starting at ending address 36 for decrements. After each memory location access is initiated, a new address for use in a subsequent memory access is generated and compared to the beginning address ending address. The comparison to the beginning address or ending address is to determine if an address boundary has been reached or exceeded such that address pointer 40 for the next memory access should "wrap around" to the other address boundary in circular buffer 32.

Knowing the beginning address and ending address of a circular buffer 32, as well as the present address pointer and displacement, the right side of equations (1) through (4) represent operations to be performed to generate the address pointer, shown on the left side of equations (1) through (4), for a subsequent memory access. When displacement is positive, equations (1) and (2) are used; when displacement is negative, equations (3) and (4) are used.

$$\begin{pmatrix} address \\ pointer \end{pmatrix} = \qquad (1)$$
$$\begin{pmatrix} address \\ pointer \end{pmatrix} + displacement \, if \, \begin{pmatrix} address \\ pointer \end{pmatrix} + displacement \leq \begin{pmatrix} ending \\ address \end{pmatrix}$$

$$\begin{pmatrix} address \\ pointer \end{pmatrix} = \begin{pmatrix} address \\ pointer \end{pmatrix} + displacement - \begin{pmatrix} ending \\ address \end{pmatrix} - 1 + \qquad (2)$$
$$\begin{pmatrix} beginning \\ address \end{pmatrix} \, if \, \begin{pmatrix} address \\ pointer \end{pmatrix} + displacement > \begin{pmatrix} ending \\ address \end{pmatrix}$$

$$\begin{pmatrix} address \\ pointer \end{pmatrix} = \begin{pmatrix} address \\ pointer \end{pmatrix} + displacement - \begin{pmatrix} beginning \\ address \end{pmatrix} + \qquad (3)$$
$$\begin{pmatrix} ending \\ address \end{pmatrix} + 1 \, if \, \begin{pmatrix} address \\ pointer \end{pmatrix} + displacement < \begin{pmatrix} beginning \\ address \end{pmatrix}$$

$$\begin{pmatrix} address \\ pointer \end{pmatrix} = \begin{pmatrix} address \\ pointer \end{pmatrix} + displacement \, if \, \begin{pmatrix} address \\ pointer \end{pmatrix} + displacement \geq \qquad (4)$$
$$\begin{pmatrix} beginning \\ address \end{pmatrix}$$

The computation performed in hardware can be minimized by precomputing coefficients used in modulo address generation. Defining coefficients alpha and beta as follows:

$$alpha = displacement - \begin{pmatrix} beginning \\ address \end{pmatrix} \, if \, displacement < 0 \qquad (5)$$

$$alpha = displacement - \begin{pmatrix} ending \\ address \end{pmatrix} + 1 \, if \, displacement \geq 0 \qquad (6)$$

$$beta = \qquad (7)$$
$$displacement - \begin{pmatrix} beginning \\ address \end{pmatrix} + \begin{pmatrix} ending \\ address \end{pmatrix} + 1 \, if \, displacement < 0$$

$$beta = \qquad (8)$$
$$displacement + \begin{pmatrix} beginning \\ address \end{pmatrix} - \begin{pmatrix} ending \\ address \end{pmatrix} + 1 \, if \, displacement \geq 0$$

Substituting alpha and beta into equations (1) and (2) results in equations (9) and (10). Equations (9) and (10) are used to compute a new address pointer when the displacement is positive.

$$\begin{pmatrix} address \\ pointer \end{pmatrix} = \begin{pmatrix} address \\ pointer \end{pmatrix} + displacement \, if \, \begin{pmatrix} address \\ pointer \end{pmatrix} + alpha < 0 \qquad (9)$$

$$\begin{pmatrix} address \\ pointer \end{pmatrix} = \begin{pmatrix} address \\ pointer \end{pmatrix} + beta \, if \, \begin{pmatrix} address \\ pointer \end{pmatrix} + alpha \geq 0 \qquad (10)$$

Substituting alpha and beta into equations (3) and (4) results in equations (11) and (12). Equations (11) and (12) are used to compute a new address pointer when the displacement is negative.

$$\begin{pmatrix} address \\ pointer \end{pmatrix} = \begin{pmatrix} address \\ pointer \end{pmatrix} + beta \, if \, \begin{pmatrix} address \\ pointer \end{pmatrix} + alpha < 0 \qquad (11)$$

$$\begin{pmatrix} address \\ pointer \end{pmatrix} = \begin{pmatrix} address \\ pointer \end{pmatrix} + displacement \, if \, \begin{pmatrix} address \\ pointer \end{pmatrix} + alpha \geq 0 \qquad (12)$$

In each of equations (9) through (12), alpha represents a comparison term and beta represents a correction term.

Figure 2:
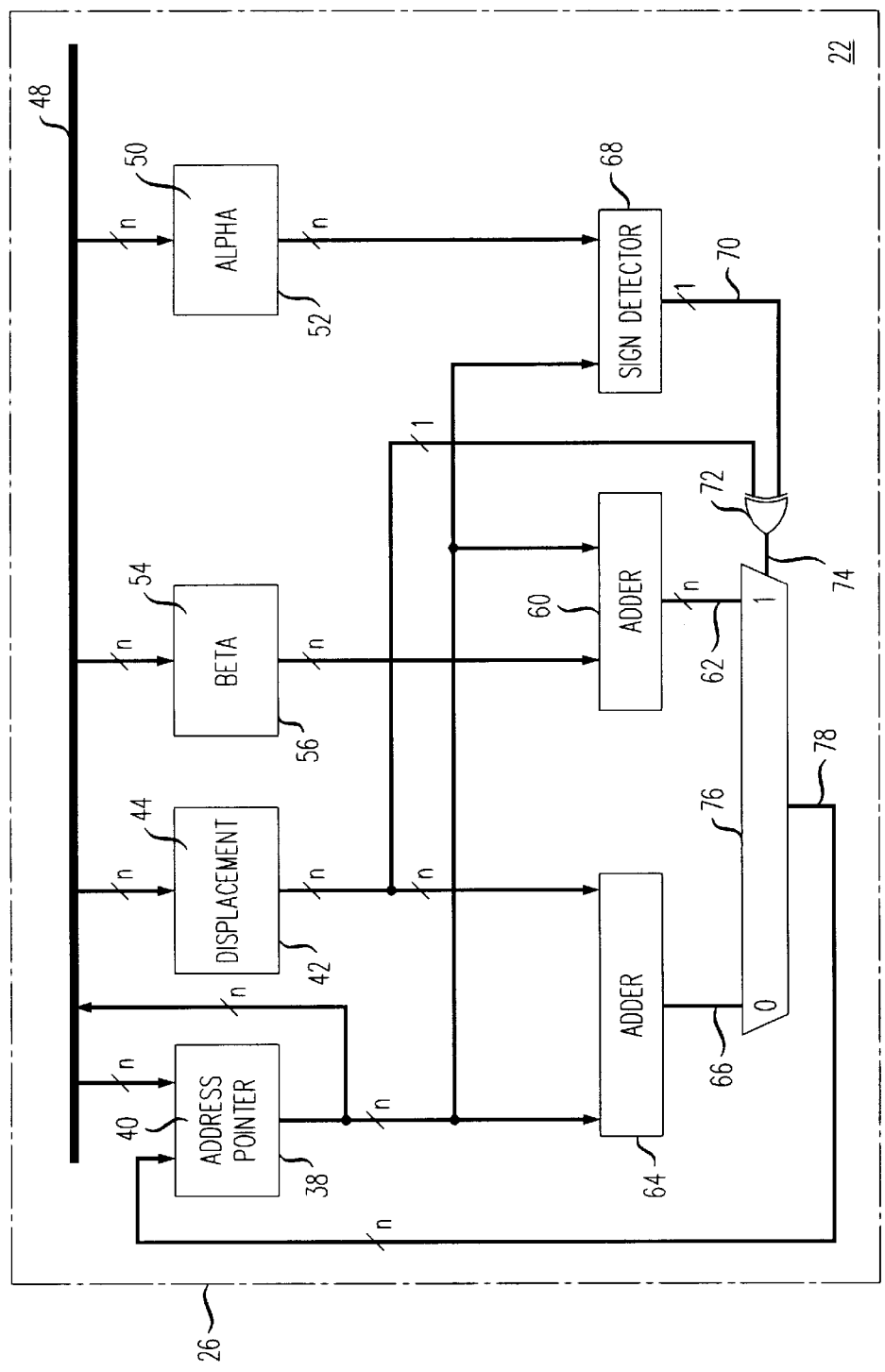
FIG. 2 is a portion of an address arithmetic unit in accordance with an illustrative embodiment of the invention.

FIG. 2 is a circuit illustrating a portion of an address arithmetic unit 22 for generating the address pointer 40 in a processor 26 such as a microprocessor, microcontroller or digital signal processor by modulo addressing, such as a result of incrementing or decrementing the value of address pointer 40. Arithmetic unit 22 implements modulo addressing in accordance with equations (9) through (12). The address pointer 40, displacement 44, alpha 52, and beta 54 are loaded from bus 48 into, respectively, address pointer register 38, displacement register 42, alpha register 50, and beta register 56. Alpha 50 and beta 54 having been precalculated in accordance with equations (5) through (8).

When the displacement 44 is negative indicating stepping through addresses of circular buffer 32 such that a subsequent address pointer decrements relative to a previous address pointer, alpha and beta are calculated in accordance with equations (5) and (7). When displacement is positive indicating stepping through addresses of circular buffer 32 such that a subsequent address pointer increments relative to a previous address pointer, alpha and beta are calculated in accordance with equations (6) and (8).

Adder 60 receives as inputs address pointer 40 from address pointer register 38 and beta 54 from beta register 56. Adder 60 adds the inputs to produce a first potential next address pointer 62 as an output.

Adder 64 receives as inputs address pointer 40 from address pointer register 38 and displacement 44 from displacement register 42. Adder 64 adds the inputs to produce a second potential next address pointer 66 as an output.

Sign detector 68 receives address pointer 38 from address pointer register 40 and alpha 50 from alpha register 52. Sign detector 68 may or may not complete the sum of the inputs but provides a single bit output 70 that is indicative of the sign of the sum of the inputs. Sign detector 68 performs a comparison that determines whether the sum of address pointer 38 and alpha 50 is greater than or equal to zero, or is less than zero.

An output 70 from sign detector 68 is combined with the sign of displacement 44, such as in exclusive OR gate 72, to provide a single output 74 as a select input to multiplexer 76.

Multiplexer 76 receives as first and second inputs the first and second potential next address pointers 62 and 66. An output 74 from exclusive OR gate 72 is coupled as the select input to multiplexer 76. When the inputs to exclusive OR gate 72 are the same logic state, multiplexer 76 selects first potential next address pointer 62 as its output 78. Multiplexer 76 selecting first potential next address pointer 62 as its output 78 indicates wraparound will occur.

When the inputs to exclusive OR gate 72 are different logic states, multiplexer 76 selects second potential next address pointer 66 as its output 78. Multiplexer 76 selecting second potential next address pointer 66 as its output indicates wraparound will not occur.

Output 78 is the modulo address pointer 40 for a subsequent memory access to circular buffer 32 and is provided as an input to address pointer register 38, where it is stored in preparation for a subsequent memory access.

Advantages of the address arithmetic unit 22 illustrated in FIG. 2 include precalculating alpha 50 and beta 54 so as to not require hardware to perform the computation, and operating adders 60 and 64 in parallel to reduce the time required to generate the next address pointer. Adders 60 and 64 operate simultaneously to calculate the first and second potential address pointers in parallel with each other and in parallel with sign detector 68 detecting the sign. Operating in parallel reduces the amount of logic in the critical path to produce an output that is the address pointer for a subsequent iteration. The potential address pointers 62 and 68 are available simultaneously and the appropriate one of the two potential address pointers is selected based on the sign detector output 88.

In the address arithmetic unit 22, there is no restriction on the magnitude of the displacement or whether the displacement is an increment or a decrement. The invention may be used in pre or post increment, or pre or post decrement modulo address generation.

The invention may be fabricated using any known VLSI processes in one or more integrated circuits with particular application in microprocessors, microcontrollers or digital signal processors. The invention is particularly useful in communication systems and equipment employing integrated circuits including circular buffers. Such communication systems and equipment have the advantage of greater flexibility to accomplish signal processing.

The invention claimed is:

1. A method of generating a new address pointer to access memory locations in a buffer in a modulo sequence, comprising the steps of:

precomputing a comparison term;

adding a current address pointer and a correction term to generate a first potential next address pointer;

adding the current address pointer and a displacement to generate a second potential next address pointer;

detecting the sign of a sum of the current address pointer and the precomputed comparison term; and logically combining a sign of the displacement with the sign of the sum to generate a control signal; and selecting between the first potential next address pointer and the second potential next address pointer based on a state of the control signal.

2. A circuit including an address arithmetic unit for generating a modulo address for stepping through addresses of memory locations in a circular buffer, comprising:

a sign detector adapted to receive an address pointer and a precomputed comparison term, the sign detector adapted to provide a sign detector output indicative of whether a sum of the inputs is of a first state or a second state;

a first adder adapted to receive as inputs the address pointer and a precomputed correction term, the first adder adapted to add the inputs to provide an output that is a first potential next address pointer;

a second adder adapted to receive as inputs the address pointer and a displacement, the second adder adapted to add the inputs to provide an output that is a second potential next address pointer;

a selector adapted to receive the first potential next address pointer as a first input and the second potential next address pointer as a second input, the selector adapted to select the first potential next address pointer as an output when the sign detector output and a sign bit of the displacement are different, and to select the second potential next address pointer as an output when the sign detector output and a sign bit of the displacement are identical.

3. The circuit as recited in claim 2, wherein the selector is a multiplexer.

4. The circuit as recited in claim 2, wherein the sign detector is an adder.

5. The circuit as recited in claim 2, wherein the circuit is an integrated circuit.

6. The circuit as recited in claim 5, wherein the integrated circuit is a digital signal processor.

7. A circuit as recited in claim 5, wherein the integrated circuit is a microprocessor.

* * * * *